Patented Jan. 5, 1954

2,665,203

UNITED STATES PATENT OFFICE 2,665,203

HERBICIDAL METHOD

William S. Emerson and Robert A. Heimsch, Dayton, Ohio, assignors to Monsanto Chemical Company, St. Louis, Mo., a corporation of Delaware No Drawing. Application January 25, 1951, Serial No. 207,845

5 Claims. (Cl. 71—2.5)

The present invention relates to herbicides and deals more particularly with methods for the general destruction of undesired plants.

A number of herbicides are known, a variety of organic and inorganic compounds having been suggested in the prior art for use as plant-killers. Among the disadvantages of known herbicides may be mentioned corrosive effect on equipment, chemical reactivity with other components customarily employed in agricultural sprays or powders, instability when exposed for long periods of time to ordinary atmospheric conditions, and soil instability, e. g. chemical reactivity with soil components and susceptibility to decomposition by soil micro-organisms, which results in loss of the active material. Thus, a herbicide possessing a free carboxy group may be substantially deactivated in alkaline soil by reaction with basic, salt-forming materials in such soils.

Now we have found that highly stable, non-corrosive herbicidal compositions are obtained by employing as the active ingredient a quinoline derivative having the general formula

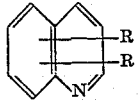

in which R is selected from the class consisting of hydrogen, alkyl radicals of from 1 to 4 carbon atoms and the nitro radical and in which only one R is hydrogen in a single compound. As examples of compounds having the above general formula may be mentioned 6-nitroquinoline, 3 - nitroquinoline, 2 - ethylquinoline, 4 - isobutyl-quinoline, 4-methyl-3-nitroquinoline, 2-ethyl-6-nitroquinoline, 3-isopropyl-5-nitroquinoline, 4-n-butyl-2-nitroquinoline, 2,4-diethylquinoline, 3,6-dinitroquinoline, etc.

The present quinolines may be readily prepared from aniline derivatives in known manner. Thus, the alkyl quinolines or the nitroquinolines may be prepared by reacting a nuclearly alkylated or nuclearly nitrated aniline, respectively, with glycerine in the presence of a dehydrating agent, such as sulfuric acid. The nitroquinolines may also be prepared by nitrating quinoline in known manner. The alkyl substituted nitroquinolines may also be obtained by reaction of an alkyl aminophenyl ketone with methazonic acid and treatment of the intermediately formed nitroethylideneamino derivative with alkali, substantially as follows.

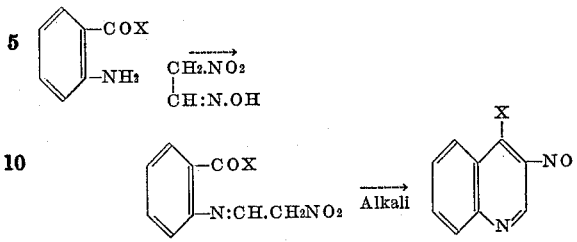

in which X is an alkyl radical of from 1 to 4 carbon atoms.

Compounds having the above general formula are effective herbicides over wide ranges of concentrations. The effectiveness may be measured by determining the inhibition of root growth as compared to similar untreated plants. The general usefulness of a herbicide may be measured by comparing the concentrations of a herbicide required to produce a certain inhibition of growth on a broad-leafed plant with the concentration of a herbicide required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited, by the following examples:

Example 1

Herbicidal activity of several alkyl- and/or nitroquinolines was determined by germination of cucumber seeds for 4 days at a temperature of 76° F. in the presence of aqueous suspensions of each of the indicated chemicals at concentration of 100 p. p. m. Seventy-five seeds were used for each test. The results are expressed as per cent length of the primary roots in the presence of the chemical compared with the length of the primary roots of controls which had been germinated in water.

| Compound Tested | Percent Growth at 100 p. p. m. |
|---|---|
| 4-Methyl-3-nitroquinoline | 2 |
| 4-Methylquinoline | 11 |
| 8-Nitroquinoline | 8 |
| 6-Nitroquinoline | 23 |
| 8-Ethylquinoline | 24 |
| 2-Methylquinoline | 28 |

Similarly good results may be obtained with other alkyl or nitroquinoline compounds, e. g., 4-n-propyl-3-nitroquinoline, 4-ethyl-3-nitroquinoline, 6-n-propyl-5-nitroquinoline, 7-nitroquinoline, 4,5-dinitroquinoline, 3,7-dimethylquinoline, etc.

The herbicidal efficiency of the present nitroquinolines is remarkable, because as shown in the table given below, nitrogen-containing heterocyclic compounds do not generally possess great herbicidal efficiency. When tested as described above, aqueous suspensions of a random group of such compounds were found to have the following effects:

| Compound Tested | Percent Growth at 100 p. p. m. |
|---|---|
| 2-Chloropyridine | 79 |
| 3,5-Dimethylpyrazole | 74 |
| 6-Nitro-1,3-benzodioxane | 36 |
| 1-Hydroxyethylbenzotriazole | 89 |
| Benzimidazole | 59 |
| 8-Nitro-6-methoxyquinoline | 68 |

Example 2

4-methyl-3-nitroquinoline was tested with both cucumber and wheat seeds and the percentage of growth inhibition measured at various concentrations. The concentration of each compound which permitted 20 per cent of normal growth (80 per cent inhibition) was determined for seeds of cucumber and wheat, respectively. The following results, expressed as parts per million of the herbicides, were obtained.

| | Cucumber | Wheat | Ratio |
|---|---|---|---|
| 4-Methyl-3-nitroquinoline | 20 | 20 | 1 |

The low narrow leaf: broad leaf ratio obtained for the nitroquinoline compound indicates general utility against both types of plants.

Herbicidal compositions containing the present quinoline compounds may be oil solution or an oil emulsion of the quinoline compound. The oil solutions may be obtained simply by dissolving the quinoline compound in oil in effective proportions. In most instances, however, it is more expedient to prepare oil concentrates of the quinoline concentrate, which oil concentrates are diluted by the consumer prior to their use. Dilution of the oil concentrates may be effected by preparing oil-in-water emulsions, i. e., by adding a small quantity of the oil concentrate to a large quantity of water. The oil concentrates may also be used for the preparation of very dilute oil solutions.

The present quinoline compounds may be made water-soluble by converting them into their salts in known manner, e. g., their hydrochlorides, sulfates, etc. The salts thus obtained are generally water-soluble compounds which often possess the herbicidal efficiencies of the parent quinoline compounds.

The present quinoline derivatives are preferably applied by spraying an aqueous suspension of the same, this method affording an easy and inexpensive way of destroying plant growth. However, they are likewise effective when applied in agricultural dusts; or they may be used with water-soluble insecticides, fungicides, etc. in customarily employed organic solutions.

The aqueous suspensions may be used to destroy already existing plant growth by direct application to the undesirable plants, or they may be employed to prevent the plant growth by application to soils. When employed to prevent plant growth, for example, in parking areas, highway abutments, railway yards, etc., they may be applied either as an aqueous spray or dust or they may be admixed with customarily employed temporary surfacing materials e. g., oils, cinders, etc. The present invention thus provides a generally useful method of preventing and destroying undesirable plant growth.

There may be employed 0.1 part to 20 parts of the quinoline compound per one-hundred parts by weight of the carrier, and in this manner an acre of land may be freed of plants by application of only a few pounds of one of the present herbicides.

What we claim is:

1. A method of destroying undesired plants which comprises applying to said plants a toxic quantity of a herbicidal composition including 8-ethylquinoline as the active ingredient.

2. A method of destroying undesired plants which comprises applying to said plant a toxic quantity of a herbicidal composition including 4-methylquinoline.

3. A method of destroying undesired plants which comprises applying to said plants a toxic quantity of a herbicidal composition including 4-methyl-3-nitroquinoline as the active ingredient.

4. A method of destroying undesired plants which comprises applying to said plants a toxic quantity of an aqueous suspension of 4-methyl-3-nitroquinoline.

5. A method of destroying undesired plants which comprises applying to said plants a toxic quantity of a herbicidal composition including as the active ingredient a quinoline compound having the formula

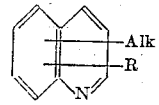

in which Alk denotes an alkyl radical of from 1 to 4 carbon atoms and R is selected from the class consisting of hydrogen and the nitro radical.

WILLIAM S. EMERSON.
ROBERT A. HEIMSCH.

References Cited in the file of this patent

UNITED STATES PATENTS

| Number | Name | Date |
|---|---|---|
| 2,427,677 | Knapp | Sept. 23, 1947 |

FOREIGN PATENTS

| Number | Country | Date |
|---|---|---|
| 474,433 | Great Britain | 1936 |
| 475,569 | Great Britain | 1936 |
| 817,081 | France | May 15, 1937 |
| 654,419 | France | Nov. 23, 1928 |

OTHER REFERENCES

Chemical Abstracts (1943), Col. 885, Abstract of article by Kermack.